United States Patent [19]
Roser

[11] 3,965,793
[45] June 29, 1976

[54] PARTICLEBOARD SCREW

[75] Inventor: Kenneth L. Roser, Rockford, Ill.

[73] Assignee: Keystone Consolidated Industries, Inc., Peoria, Ill.

[22] Filed: Oct. 18, 1973

[21] Appl. No.: 407,424

Related U.S. Application Data

[63] Continuation of Ser. No. 205,836, Dec. 8, 1971, abandoned.

[52] U.S. Cl. ................................................ 85/41
[51] Int. Cl.² ........................................ F16B 25/00
[58] Field of Search ............. 85/41, 46, 47, 48, 43; 10/10 R; 52/363; 151/22

[56] References Cited
UNITED STATES PATENTS

| 362,833 | 5/1887 | Harvey | 85/46 |
| 3,270,472 | 9/1966 | Gilbert | 85/47 X |
| 3,286,579 | 11/1966 | Lovisek | 85/41 |
| 3,748,949 | 7/1973 | Dreger | 85/46 |

FOREIGN PATENTS OR APPLICATIONS

| 1,440,812 | 4/1966 | France | 85/46 |

Primary Examiner—Ramon S. Britts
Attorney, Agent, or Firm—Allegretti, Newitt, Witcoff & McAndrews

[57] ABSTRACT

A screw fastener for use in particleboard or similar material having a screw thread formed with an included angle of 48°, a constant depth thread and a gimlet type point.

1 Claim, 5 Drawing Figures

Inventor
Kenneth L. Roser
by: Wilson & Geppert
Atty's

PARTICLEBOARD SCREW

This is a continuation of application Ser. No. 205,836 filed Dec. 8, 1971 now abandoned.

The present invention relates to a particleboard screw, and more particularly to a screw for use in particleboard or similar material which has improved performance characteristics over presently known wood screws.

Among the objects of the present invention is the provision of a screw for use in particleboard or similar materials where the screw thread has an included angle of 48° and a larger root width between the threads on the shank than previous wood screws. The screw also has a smaller minor diameter than previous wood screws and a gimlet type point for ease of starting the screw in the board. The screw thread is of a constant depth throughout and extends onto the gimlet-type point to the end of the screw.

Another object of the present invention is the provision of a screw for use in particleboard or other material which has improved performance characteristics. Thus, the present screw has better holding power in particleboard, a more consistent pull-out value, lower driving torque, higher strip torque and a faster driving speed than other known wood screws.

Further objects are to provide a construction of maximum simplicity, efficiency, economy and ease of operation, and such further objects, advantages and capabilities as will later more fully appear and are inherently possessed thereby.

Figure 1:
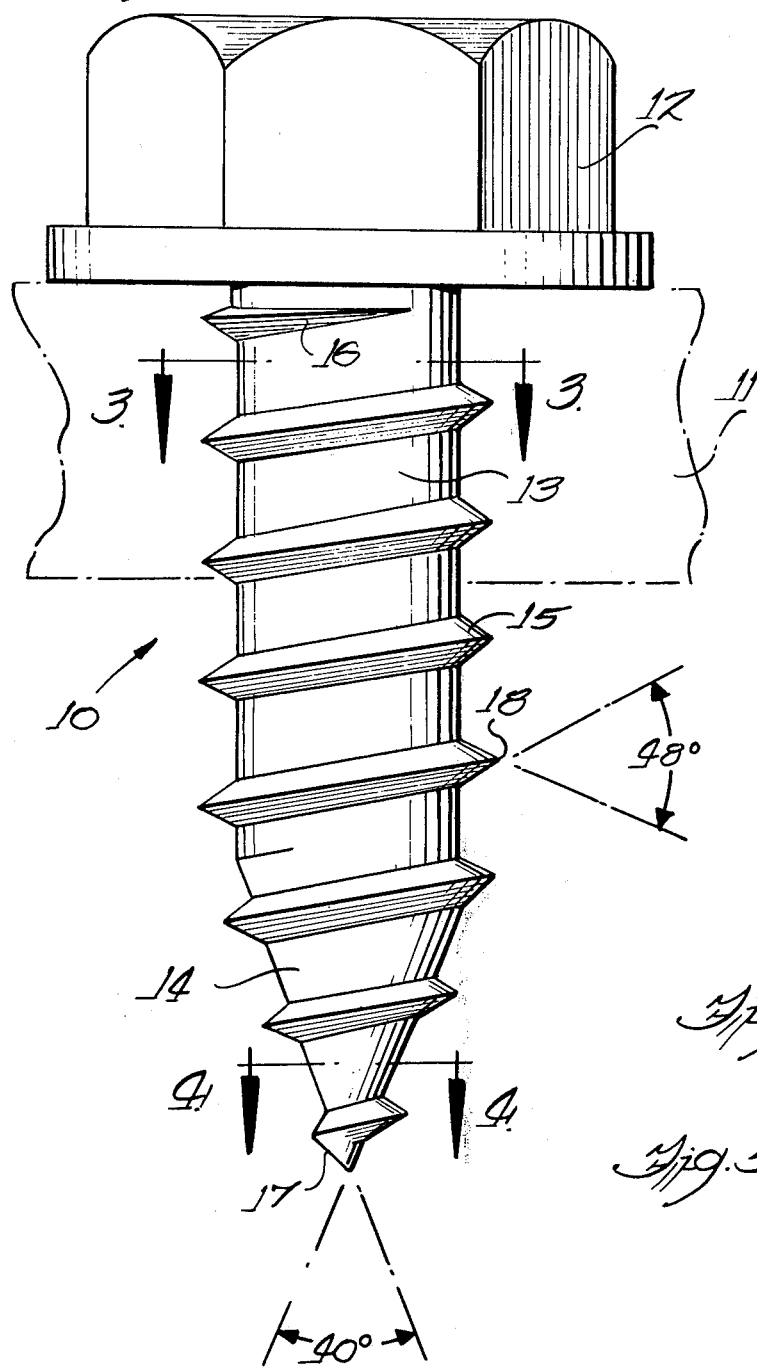
FIG. 1 is a front elevational view of the particleboard screw of the present invention.
Figure 2:
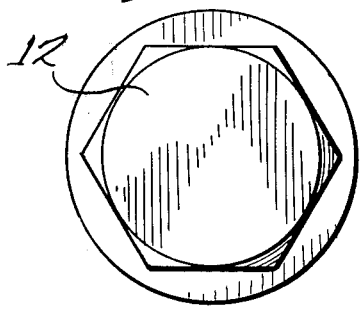
FIG. 2 is an end elevational view on a reduced scale of the head of the screw.
Figure 3:
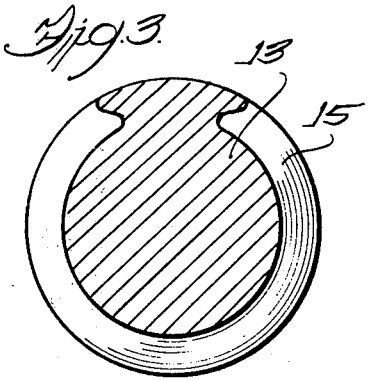
FIG. 3 is a horizontal cross sectional view taken on the line 3—3 of FIG. 1.
Figure 4:
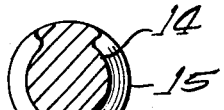
FIG. 4 is a horizontal cross sectional view taken on the line 4—4 of FIG. 1.
Figure 5:
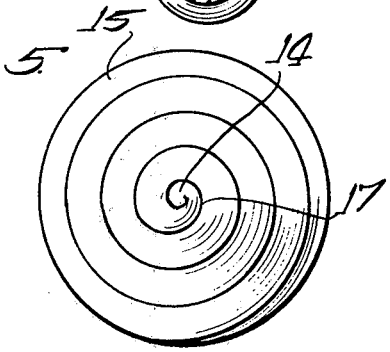
FIG. 5 is an end elevational view of the gimlet-type point of the screw.

Referring more particularly to the disclosure in the drawing wherein is shown an illustrative embodiment of the present invention, FIG. 1 discloses a screw 10 to be used for a sheet of particleboard or similar material 11 to fasten or secure a member to the board or to secure the board to another board or member.

The screw 10 includes an enlarged driving head 12 of any suitable configuration, a cylindrical shank 13 and a gimlet-type point 14. Formed on the shank and point is a helical thread 15 of a substantially constant depth except where the thread merges into the shank 13 adjacent the head 12 as seen at 16 and where the thread merges into the point at 17. The thread 15 is formed with a substantially sharp crest 18 having an included angle of 48° throughout the length of the screw. Also, the gimlet-type point has an included angle of approximately 40°.

Conventional wood screws are provided with threads having an included angle of 60° at the thread crest with standardized major and minor diameters. Comparing the screw 10 with a conventional wood screw of the same size, the major thread diameters are identical while the minor thread diameter and the threads per inch of the screw 10 are both less than those for the conventional wood screw. As the threads per inch is less for the screw 10, the root width between threads is greater than that for a conventional wood screw. Thus, the screw 10 when compared to an identically sized conventional wood screw has a sharper thread crest, a greater thread depth and a greater root distance between the threads.

The following table shows the comparisons between the screw of the present invention and conventional wood screws having a 60° thread form.

TABLE I

| Screw | Threads/in. | Maj. dia. | Root dia. | Thread Depth | Pitch Distance Between Threads |
|---|---|---|---|---|---|
| 48° screw No. 8 | 12 | 0.1635 | 0.0970 | 0.0333 | 0.0833 |
| 60° screw No. 8 | 18 | 0.1635 | 0.1190 | 0.0223 | 0.0556 |
| 48° screw No. 10 | 12 | 0.1860 | 0.1100 | 0.0380 | 0.0833 |
| 60° screw No. 10 | 16 | 0.1860 | 0.1380 | 0.0240 | 0.0625 |
| 48° screw No. 12 | 11 | 0.2120 | 0.1380 | 0.0370 | 0.0909 |
| 60° screw No. 12 | 14 | 0.2120 | 0.1605 | 0.0258 | 0.0714 |
| 48° screw No. 1/4 | 10 | 0.2430 | 0.1605 | 0.0413 | 0.1000 |
| 60° screw No. 1/4 | 14 | 0.2430 | 0.1805 | 0.0273 | 0.0714 |

From these comparisons, it is seen that the conventional wood screw has a major diameter that is in the range of 1.29 to 1.37 times the root diameter, while the screw 10 has a major diameter that is in the range of 1.51 to 1.69 times the root diameter. Also, the pitch distance between threads of the screw 10 is in the range of 1.27 to 1.49 times the pitch distance between threads of the conventional screw. A comparison of the width of the root between the threads shows that the width of the root of the screw 10 between the threads is in the range of 1.46 to 1.93 times the width of the root of the conventional screw with a 60° thread form.

The 48° form of the screw 10 adapts well to the thread rolling process by which it is formed and has improved performance characteristics over the conventional wood screw. Tests were made in various grades of density of particleboard with respect to holding power, pull-out, drive and strip torque and driving speed of identical sizes of conventional screws with a 60° thread form and the screw 10 with a 48° thread form. The results of these tests showed that the screw 10 had 8% to 13% better holding power and much more consistent pull-out than the conventional wood screw, a lower drive torque and a higher strip torque, and an approximately 17% faster driving speed than the conventional screw.

Thus, the present screw has improved performance characteristics over conventional wood screws due to the factors of (1) a 48° form, (2) a lesser minor or root diameter and (3) a lesser number of threads per inch which provides a greater root width between the threads of the screw.

I claim:

1. A threaded fastener formed by roll thread methods for use in particleboard and similar materials comprising a cylindrical shank having a driving head at one end and a gimlet-type point at the opposite end, said point having an included angle of about 40° and a helical thread on the shank and point of constant depth except where the thread merges into the shank adjacent the head, said thread having a generally sharp crest with an included angle of approximately 48° and a substantially cylindrical and relatively wide root between each thread turn with the ratio of root diameter to pitch being substantially in the range of 1.2 to 1.6 and varying substantially uniformly and inversely as the ratio of the major diameter to the root diameter varies in the range of 1.5 to 1.7, said thread having a constant depth on the point with a decreasing major diameter and a thread crest with an approximately 48° included angle.

* * * * *